(No Model.)

C. S. DORR.
MEDICINE SPOON.

No. 353,055. Patented Nov. 23, 1886.

WITNESSES
Geo. K. Storm.
Chas. C. Hook.

Conrad S. Dorr
By Howard Bros

INVENTOR

ATTORNEYS.

United States Patent Office.

CONROD S. DORR, OF WHEELING, WEST VIRGINIA.

MEDICINE-SPOON.

SPECIFICATION forming part of Letters Patent No. 353,055, dated November 23, 1886.

Application filed April 23, 1885. Renewed July 15, 1886. Serial No. 208,143. (No model.)

*To all whom it may concern:*

Be it known that I, CONROD S. DORR, a resident of Wheeling, in the county of Ohio and State of West Virginia, have invented certain new and useful Improvements in Medicine-Spoons; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a spoon for taking liquid medicines that will not corrode or discolor by use, and by which medicines containing corrosive acids can be given the patient without liability of the same coming in contact with the teeth and leaving a disagreeable taste in the mouth; and the invention consists of a "gourd-shaped" spoon made of glass, with a hollow handle, having a graduate formed on the side of the bowl to determine the amount of liquid to be taken at a dose.

Figure 1:
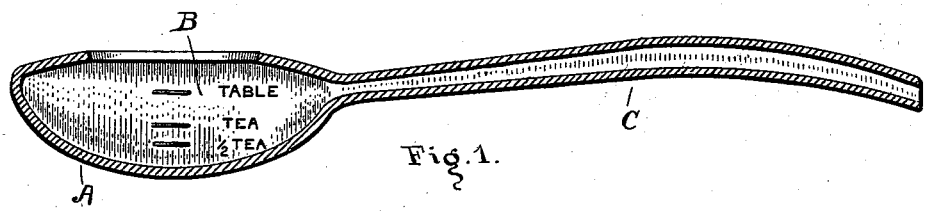
Figure 2:
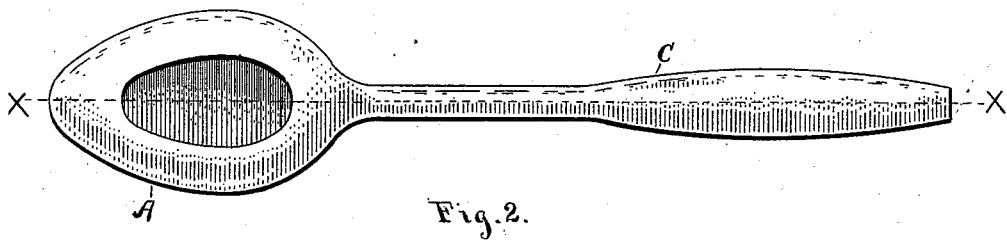

In the drawings, Figure 1 is a lengthwise section of the spoon on line $x$ $x$, and Fig. 2 is a top view of the same.

The letter A designates the bowl of the spoon, in which the liquid is placed. The upper edges of the bowl extend over the interior all around said bowl, leaving a central opening through which it may be filled, and providing for convenient manipulation without spilling the contents. On the side of the bowl I form a graduate-scale, B, setting forth the amount of liquid to be poured in the bowl to make one-half tea-spoonful, one tea-spoonful, and one table-spoonful. The graduate-scale consists of raised letters and lines on the surface of the glass, formed by corresponding depressions in the mold in which the article is shaped. It can also be etched or engraved on the surface of the glass, if found desirable, and any other form of graduate can be used to designate the quantity.

C is the handle, which is made hollow or tubular in form and open at both ends for the purpose of allowing the liquid to flow from the bowl of the spoon through the handle.

In using the spoon the handle is placed into the mouth, instead of the bowl, as usual with the common form of spoons, and by means of the hollow handle the liquid is carried back into the mouth and does not come in contact with the teeth of the patient.

I prefer to make the spoon of clear transparent glass, because glass is not liable to corrode or discolor, like metallic spoons, and it is easily cleaned. For convenience in cleaning I use a small swab similar to a lamp-chimney cleaner.

Having described my invention, what I claim, and desire to secure by Letters Patent, is—

A medicine-spoon having a graduated bowl partially covered by the upper edges, which extend over the body, leaving only a central opening, and provided with a hollow handle through which the medicine is administered to the patient, all made of a single piece of glass, substantially as specified.

In testimony that I claim the foregoing as my own I hereby affix my signature in presence of two witnesses.

CONROD S. DORR.

Witnesses:
GEO. K. STORM,
CHAS. C. HOOK.